(No Model.) 3 Sheets—Sheet 1.

M. T. CHAPMAN.
DRILL FOR SINKING WELL TUBING.

No. 309,927. Patented Dec. 30, 1884.

Witnesses:
Albert H. Adams.
O. W. Bond.

Inventor:
Matthew T. Chapman (No Model.) 3 Sheets—Sheet 2.
M. T. CHAPMAN.
DRILL FOR SINKING WELL TUBING.

No. 309,927. Patented Dec. 30, 1884.

Witnesses:
Albert H. Adams
O. W. Bond

Inventor:
Matthew T. Chapman (No Model.) 3 Sheets—Sheet 3.

M. T. CHAPMAN.
DRILL FOR SINKING WELL TUBING.

No. 309,927. Patented Dec. 30, 1884.

Witnesses:
Albert H. Adams
O. W. Bond

Inventor:
Matthew T. Chapman

UNITED STATES PATENT OFFICE.

MATTHEW T. CHAPMAN, OF AURORA, ILLINOIS.

DRILL FOR SINKING WELL-TUBING.

SPECIFICATION forming part of Letters Patent No. 309,927, dated December 30, 1884.

Application filed June 16, 1884. (No model.)

*To all whom it may concern:*

Be it known that I, MATTHEW T. CHAPMAN, residing at Aurora, in the county of Kane and State of Illinois, and a citizen of the United States, have invented certain new and useful Improvements in Drills for Sinking Well-Tubing, of which the following is a full description, reference being had to the accompanying drawings, in which—

Figure 1:
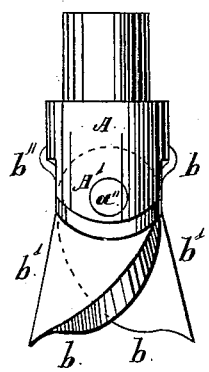
Figure 2:
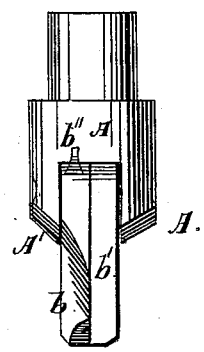
Figure 3:
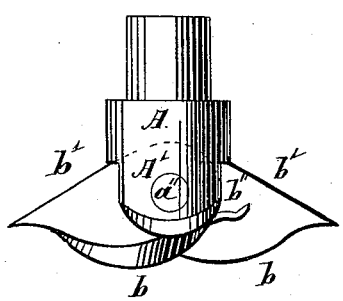
Figure 6:
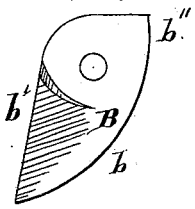
Figure 5:
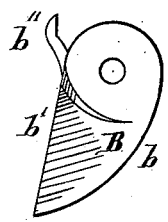
Figure 4:
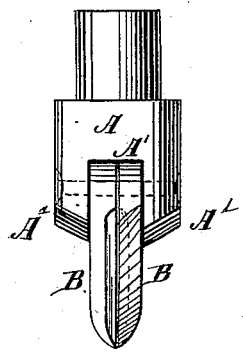
Figure 7:
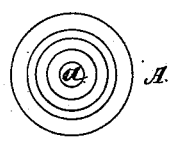
Figures 14, 15:
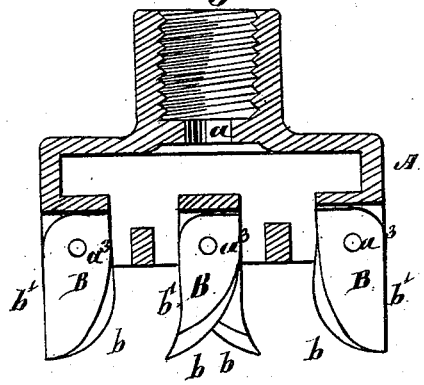
Figure 8:
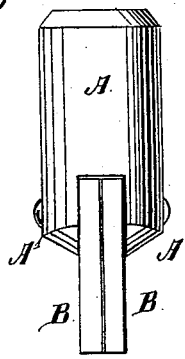
Figure 16:
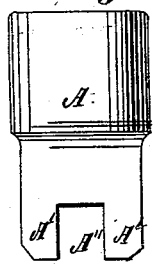
Figure 9:
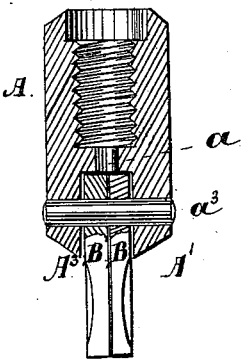
Figure 10:
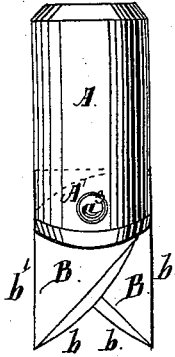
Figure 11:
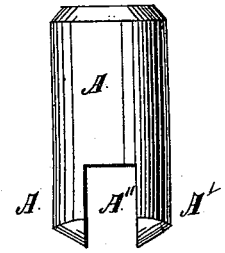
Figure 12:
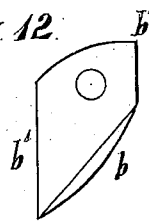
Figure 13:
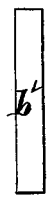
Figure 17:
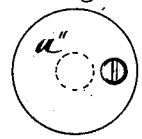
Figure 18:
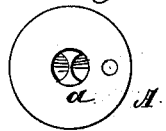
Figure 19:
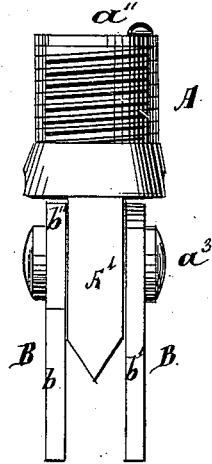
Figure 22:
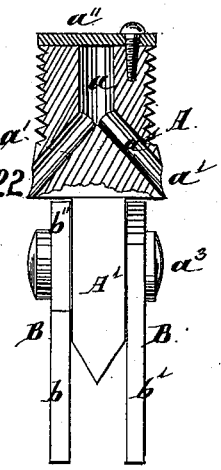
Figure 20:
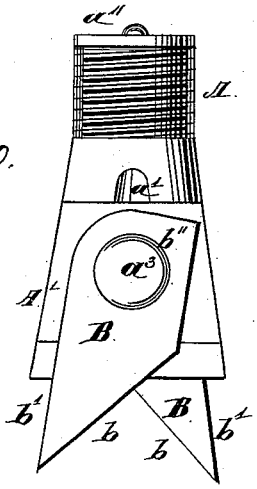
Figure 21:
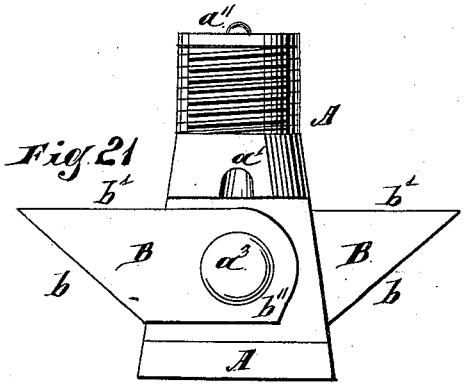

Figure 1 is a side elevation with the blades closed; Fig. 2, an edge elevation; Fig. 3, a side elevation with the blades open; Fig. 4, an edge elevation showing a different cutting-blade; Figs. 5 and 6, details of one of the blades, showing a different form of stop; Fig. 7, a top view of the head; Fig. 8, an elevation showing another form of head; Fig. 9, a vertical section through the head of Fig. 8; Fig. 10, a side elevation of the form shown in Fig. 8; Fig. 11, an elevation of the head of Fig. 8 with the blades removed; Figs. 12 and 13, side and edge views, respectively, of the blades in Fig. 8; Fig. 14, a vertical section of a head carrying several sets of blades; Fig. 15, a bottom view of the head of Fig. 14; Fig. 16, an end elevation of the same; Fig. 17, a top view showing a valve on top of the head; Fig. 18, a similar view with the valve removed; Fig. 19, an edge elevation of a head and another form of blades; Fig. 20, a side elevation with the blades closed; Fig. 21, a side elevation with the blades open; Fig. 22, a vertical section through the head, with the blades in edge view.

This invention has for its object to sink a hole for the reception of a tubing, and have such hole made larger than the tube it is to receive, so as to enable the tube to be readily sunk; and its nature consists in a drill the blades of which are pivoted, to be expanded beyond the periphery of the carrying-head, and form an opening of a larger diameter than the diameter of the tube to be sunk, all as hereinafter more specifically described, and pointed out in the claims.

In the drawings, A represents a head carrying the cutting-blades. This head may be formed, as shown in Figs. 1, 2, 3, and 4, with depending ears A', between which is an opening, A'', for the reception of the blades, and with a socket portion at its upper end, in which is a screw-threaded opening, as shown in Fig. 9, for the attachment of the drill-rod, the head also having a small opening, a, as shown in Fig. 9, for the passage of water, as hereinafter described. The head may also be formed, as shown in Figs. 19, 20, 21, and 22, with a single pendant, A', on each side of which the cutting-blades are located, the pendant having its lower end sharpened to form a cutting-edge, and the exterior of the head is screw-threaded for the attachment of the drill-rod, and this form of head, instead of having a single opening a for the passage of water, has an opening a with branch openings a' leading therefrom to the exterior of the head, as shown in Fig. 22.

The heads thus far referred to are adapted to carry only a single pair of cutting-blades; but a form of head is shown in Figs. 14, 15, and 16 for carrying several pairs of blades, in which form the head has a tubular portion with an interior screw-thread for the attachment of the drill-rod, and a main or body portion elongated and provided with a recess in which the blades are pivoted, the head having a single opening a between its tubular and main portion for the passage of water, and the length of the main or body portion in this form of construction will depend upon the size of opening to be cut, and the number of blades used will also be varied to suit the size of opening.

The head having the branch openings shown in Fig. 22 is designed to be used with a drill-rod, which also acts as a piston-rod, and for this purpose the top of the head is provided with a flat valve, a'', which allows the water and material cut away to pass up into the drill-rod to be discharged. This form of construction can also be applied to other forms of heads.

The drill is designed to be used with a hollow drill-rod, through which water can be passed to assist in the cutting, and for this purpose the head is provided with the interior opening a, to allow the water to pass down and out between the cutting-blades, and for this purpose a single opening or two or more openings may be provided.

B represents the cutting-blades, several varieties of which, in relation to the cutting-edges, are shown, but all of which are pivotally attached, so as to be expansible by coming in contact with the bottom of the opening.

The blades shown in Figs. 1 to 6, inclusive, are each provided with a curved and beveled edge, $b$, and a straight edge, $b'$, the curved beveled edge forming the cutting-edge, and these blades are pivoted, as shown in Fig. 1, so as to have their straight edges on the outside, and so that when closed, as shown in Fig. 1, the beveled edges $b$ will be in position to strike and force the blades outward, as shown in Fig. 3, thus expanding them.

As shown in Fig. 5, a stop, $b''$, is formed by a horn or projection extending up from the upper outside corner of the blade, and, as shown in Fig. 6, the stop $b''$ is formed by extending the top of the blade straight across, the object being to prevent the blades from folding in beyond a point where they would not be expanded by coming in contact. These blades have the inner faces lying adjacent to each other and on the straight edge cut out so as to form a depressed portion, as shown in Figs. 5 and 6.

The blades shown in Figs. 8, 9, and 10 and the detail Figs. 12 and 13 are similar to those just described in having a curved beveled edge and a straight edge, but differ from the form shown in Fig. 6 in having their inner adjacent faces left plane, and these blades are pivoted to the head, so that when dropped they will expand by the force of the contact.

The blades shown in Figs. 19, 20, 21, and 22 differ from those thus far described in having a diagonal straight edge instead of a curved, and in not having such edge beveled, and these blades are pivoted to the pendant $A'$, so that they will be expanded as the drill is dropped by the force of the contact. The blades are pivoted to the head by a suitable pivot, $a^3$, which pivot passes through the blades and through the ears $A'$ or the pendant $A'$. The head carrying several pairs of blades has the blades pivoted in the opening of its body portion in pairs by pins or pivots $a$, and the blades are arranged in pairs in the same manner as where a single pair of blades are used to have the several pairs expanded as the drill is dropped by the force of the contact, and, as shown, the blades used in this form of construction have a curved beveled edge, $b$, and a straight edge, $b'$; but the other forms of blades can be used.

In operation the drill-head A is to be attached to a hollow drill-stock, or to a hollow drill-rod, through which water can pass, which rod is to be connected by a rope with the hoisting-drum or windlass, so that the rod can be raised and with it the drill, and such raising of the rod and drill causes the blades or bits B, when expanded, to be folded by coming in contact with the wall of the hole, which starts the blades or bits, so that they will fall together by gravity, and when the rod and drill have been lifted to the required height they are allowed to drop suddenly, bringing the blades or bits in contact with a resisting surface at the bottom of the hole, which contact, through the form of the edges $b$, throws the blades or bits outward, causing them to occupy an increased space and cut an opening larger in diameter than the diameter of the head or pipe to be sunk. This operation is essentially the same with the series of blades or bits shown in Figs. 14 and 15, except that instead of expanding only two blades or bits the entire series will be expanded.

When the drill is to be used in connection with a drill-rod which also forms a pump or suction rod, the head is to be provided with openings leading to the exterior, either as shown in Fig. 22 or otherwise, and the top of the head is to be provided with a flat valve.

The blades or bits in each case are pivoted above their center longitudinally, so that the natural effect of gravity will be to cause them to drop or fold together, and the pivoting and manner of attachment is to be one that will leave sufficient play for the ready folding of the bits or blades and their ready expansion by coming in contact with a resisting surface.

What I claim as new, and desire to secure by Letters Patent, is—

1. A drill-head, A, provided with an opening, $a$, in combination with bits or blades B, pivotally attached to the head, substantially in the manner and for the purposes specified.

2. A drill-head, A, provided with openings leading to the exterior, in combination with pivoted bits or blades, substantially as and for the purposes specified.

MATTHEW T. CHAPMAN.

Witnesses:
O. W. BOND,
ALBERT H. ADAMS.